US012142101B2

(12) United States Patent
Grohman et al.

(10) Patent No.: US 12,142,101 B2
(45) Date of Patent: Nov. 12, 2024

(54) WIRELESS AUTHENTICATION SYSTEMS AND METHODS

(71) Applicant: I.D. SYSTEMS, INC., Woodcliff Lake, NJ (US)

(72) Inventors: Wojciech Grohman, Woodcliff Lake, NJ (US); Michael Ehrman, Woodcliff Lake, NJ (US)

(73) Assignee: I.D. SYSTEMS, INC., Woodcliff Lake, NJ (US)

( * ) Notice: Subject to any disclaimer, the term of this patent is extended or adjusted under 35 U.S.C. 154(b) by 0 days.

(21) Appl. No.: 18/527,539

(22) Filed: Dec. 4, 2023

(65) Prior Publication Data
US 2024/0096156 A1   Mar. 21, 2024

Related U.S. Application Data

(63) Continuation of application No. 17/717,750, filed on Apr. 11, 2022, now Pat. No. 11,837,041, which is a
(Continued)

(51) Int. Cl.
*G07C 9/28* (2020.01)
*H04W 12/0431* (2021.01)
*H04W 12/06* (2021.01)

(52) U.S. Cl.
CPC .......... *G07C 9/28* (2020.01); *H04W 12/0431* (2021.01); *H04W 12/06* (2013.01)

(58) Field of Classification Search
CPC ................ G07C 9/28; G07C 2209/08; H04W 12/04031; H04W 12/06; H04K 3/00; H04K 3/41; H04K 3/45; H04K 3/60; H04K 3/62; H04K 3/65; H04K 3/80; H04K 3/86; H04K 3/88; H04K 3/92; H04K 2203/20; H04K 2203/22; B60K 28/02; B60K 28/04; B60K 28/06; B60K 28/066; B60K 28/063; B60R 25/24; B60R 25/245; B60R 25/246; B60R 25/1025; B60R 25/2072; B60R 2325/10; B60R 2325/101; B60R 2325/103; B60R 2325/105; B60R 2325/106; B60R 2325/108; B60R 2325/20; B60R 2325/202; B60R 2325/205
(Continued)

(56) References Cited

U.S. PATENT DOCUMENTS 4,595,902 A   6/1986   Proske et al.
5,767,784 A   6/1998   Khamharn
(Continued)

FOREIGN PATENT DOCUMENTS

GB   2450154 A      12/2008
WO   2020002921 A1   1/2020

*Primary Examiner* — Nam V Nguyen
(74) *Attorney, Agent, or Firm* — Troutman Pepper Hamilton Sanders LLP; James E. Schutz; Korbin M. Blunck

(57) ABSTRACT

A wireless authentication interference unit comprising: a receiver; a transmitter; and a controller configured to: detect, via the receiver, a first wireless signal indicative of a wireless authentication protocol between an authentication terminal and an authentication key; and output, via the transmitter, an interference signal during a broadcast of an authentication message from the authentication key, wherein the interference signal disrupts authentication of the authentication key by the authentication terminal.

20 Claims, 10 Drawing Sheets

Related U.S. Application Data continuation of application No. 16/931,659, filed on Jul. 17, 2020, now Pat. No. 11,302,132.

(58) Field of Classification Search
USPC ........... 340/340, 5.61, 5.28, 5.31, 5.72, 576; 455/4.1; 380/252, 253, 254, 270
See application file for complete search history.

(56) References Cited

U.S. PATENT DOCUMENTS

| | | | |
|---|---|---|---|
| 6,429,768 B1 | 8/2002 | Flick | |
| 8,543,053 B1 | 9/2013 | Melamed et al. | |
| 8,841,987 B1 | 9/2014 | Stanfield et al. | |
| 10,043,329 B2 | 8/2018 | Murray et al. | |
| 10,870,413 B2 * | 12/2020 | Zhu | B60R 25/245 |
| 11,302,132 B1 | 4/2022 | Groham et al. | |
| 11,837,041 B2 * | 12/2023 | Grohman | H04W 12/06 |
| 2001/0033222 A1 | 10/2001 | Nowottnick et al. | |
| 2005/0007235 A1 | 1/2005 | Stasi | |
| 2006/0176147 A1 | 8/2006 | Pohlmann et al. | |
| 2007/0075145 A1 | 4/2007 | Arendonk | |
| 2009/0021343 A1 | 1/2009 | Sinha | |
| 2009/0061759 A1 | 3/2009 | Stoddard et al. | |
| 2012/0055726 A1 | 3/2012 | Hannon | |
| 2013/0082820 A1 | 4/2013 | Tieman | |
| 2016/0107610 A1 | 4/2016 | Lemoult et al. | |
| 2016/0344510 A1 | 11/2016 | Shishkin et al. | |
| 2017/0057353 A1 | 3/2017 | Griffin | |
| 2017/0294062 A1 | 10/2017 | Van Wiemeersch et al. | |
| 2018/0232971 A1 * | 8/2018 | Schieke | H04L 63/0861 |

* cited by examiner

WIRELESS AUTHENTICATION SYSTEMS AND METHODS

CROSS-REFERENCE TO RELATED APPLICATION AND PRIORITY CLAIM

This application is a continuation of U.S. patent application Ser. No. 17/717,750, filed 11 Apr. 2022, entitled "WIRELESS AUTHENTICATION SYSTEMS AND METHODS," now U.S. Pat. No. 11,837,041, which is a continuation of U.S. patent application Ser. No. 16/931,659, filed 17 Jul. 2020, entitled "WIRELESS AUTHENTICATION SYSTEMS AND METHODS," now U.S. Pat. No. 11,302,132, the entire contents and substance of each of which is incorporated herein by reference as if fully set forth below.

FIELD

The present disclosure relates to keyless systems, and, more particularly, to systems and methods for wireless authentication.

BACKGROUND

Traditionally, activating a secured system requires physical interaction. For example, entering a locked room requires interacting with a physical lock using a physical key. Similarly, motor vehicles utilize an ignition lock that required a physical ignition key to start the motor vehicles' engines. More recently, the use of a physical key has been replaced with wireless authentication systems. For certain secured facilities, an ID badge or security fob may be capable of emitting an authentication signal to open doors. Similarly, in motor vehicles, a keyless ignition system can replace the use of a physical key by using a fob that interacts with a receiver in the motor vehicle. When a "start" button is pushed, the motor vehicle broadcasts a request signal, and the fob responds with an authentication response. After the authentication response is received, the motor vehicle validates the response and starts the motor vehicle's engine.

Wireless authentication provides several benefits over physical authentication systems. First, wireless authentication is more convenient as a user can be authenticated without physically interacting with the system. For example, with a motor vehicle, a user can leave a fob in their pocket or purse to start the vehicle. Additionally, wireless authentication allows the use of advanced security measures to protect the wireless authentication key from being compromised. For example, since the wireless authenticator exchanges encrypted or secret information, it cannot be easily replicated.

One drawback of wireless authentication systems, however, is that they respond to anyone having the authenticator. For instance, if a third-party steals an ID badge, they can access the secured area. Similarly, if a car's fob is stolen or copied, the vehicle will respond to the possessor of the fob as if the possessor were a legitimate user. Therefore, there is a need for improved systems and methods for wireless authentication.

SUMMARY

According to an embodiment, there is provided a wireless authentication interference unit including: a receiver; a transmitter; and a controller configured to: detect, via the receiver, a first wireless signal indicative of a wireless authentication protocol between an authentication terminal and an authentication key; and output, via the transmitter, an interference signal during a broadcast of an authentication message from the authentication key, wherein the interference signal disrupts authentication of the authentication key by the authentication terminal.

According to an embodiment, there is provided a wireless authentication method including: detecting, by an interference unit, a first wireless signal indicative of a wireless authentication protocol between an authentication terminal and an authentication key; and outputting, by the interference unit, an interference signal during a broadcast of an authentication message from the authentication key, wherein the interference signal disrupts authentication of the authentication key by the authentication terminal.

A method of installing a wireless authentication interference unit, the method including: configuring the wireless authentication interference unit to an authentication terminal; and positioning the wireless authentication interference unit proximal to the authentication terminal, the wireless authentication interference unit comprising a controller configured to detect a first wireless signal indicative of a wireless authentication protocol between the authentication terminal and an authentication key, and output an interference signal during a broadcast of an authentication message from the authentication key to disrupt authentication of the authentication key by the authentication terminal.

A wireless authentication interference system including: an interference unit configured to: detect a first wireless signal indicative of a wireless authentication protocol between an authentication terminal and an authentication key, and output an interference signal during a broadcast of an authentication message from the authentication key, wherein the interference signal disrupts authentication of the authentication key by the authentication terminal; and an interference controller configured to control an activation state of the interference unit.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
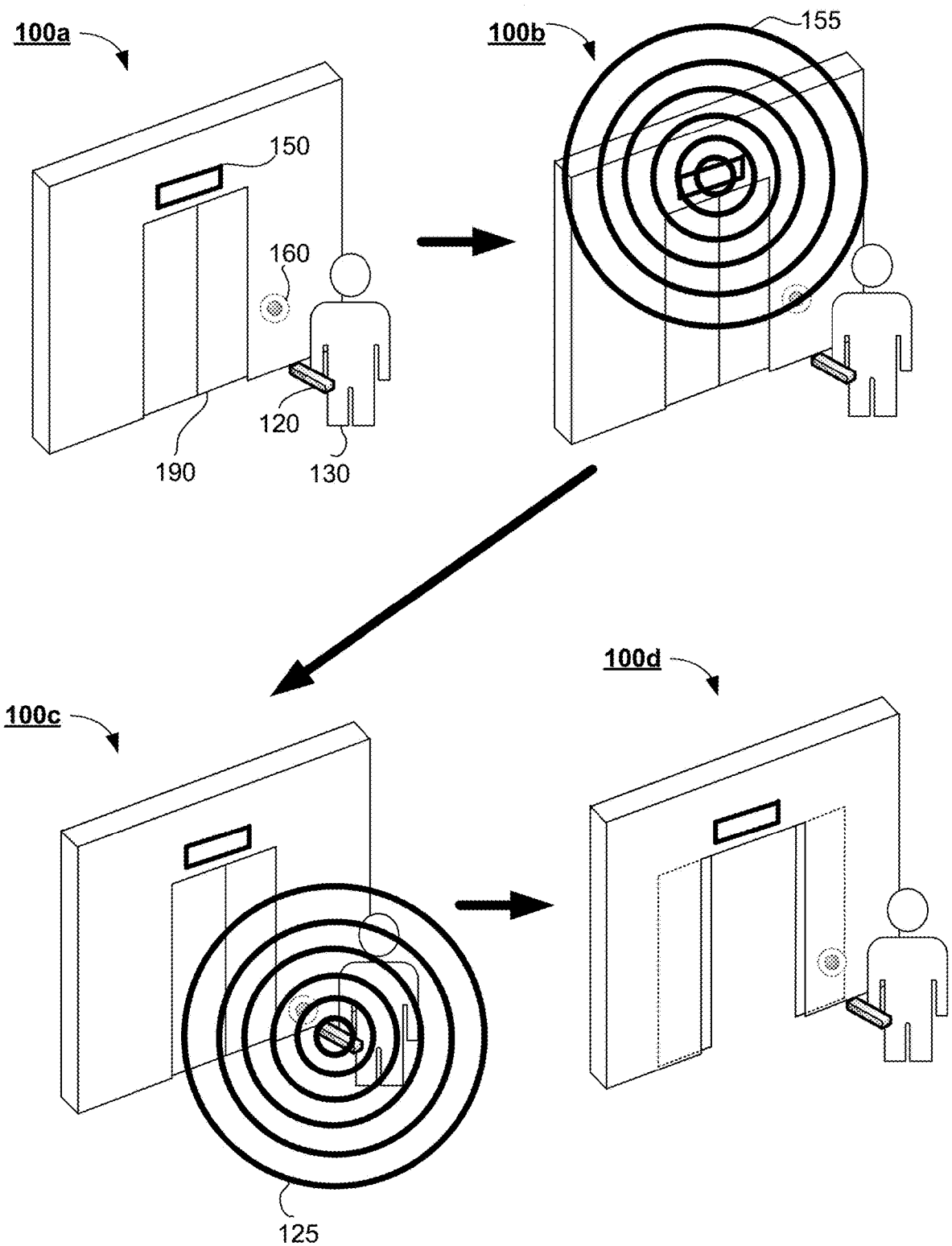
FIG. 1 illustrates an example a wireless authentication environment.

The present disclosure can be understood more readily by reference to the following detailed description of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. Some example embodiments of the disclosed technology will be described more fully hereinafter with reference to the accompanying drawings. The disclosed technology might be embodied in many different forms and should not be construed as limited to the example embodiments set forth herein.

Aspects of the present disclosure relate to systems and methods for providing enhanced wireless authentication. In an embodiment, an interference unit responds to a request signal (e.g., authentication request) to "jam" or otherwise interfere with the response signal from the authenticator. The interference unit responding together with an authentication key "confuses" the authentication system, making it unable to verify the response signal (e.g., authentication response). For example, when a "start" button is pushed, the motor vehicle broadcasts a request signal. As discussed above, when the fob receives the request signal, it outputs a wireless response. The interference unit likewise receives the request signal broadcast from the motor vehicle and outputs its own wireless response at or about the same time. Thus, the motor vehicle receives a response from both the fob and the interference unit around the same time, or in quick succession and the motor vehicle is unable to authenticate the fob's response signal due to the additional signal from the interference unit. In some cases, the interference unit could detect the wireless response from the fob and, in response, outputs an interference signal (e.g., an interference signal, modification signal, etc.). Thus, the motor vehicle may still receive a response from both the fob and the interference unit around the same time, or in quick succession, and the motor vehicle is unable to authenticate the fob. By outputting the response or interference signal only in response to detecting the request signal and/or response signal from the authentication device, the interference unit may have enhanced battery life.

In some cases, the interference unit may receive wireless instructions (e.g., WiFi, Bluetooth, 4G, 5G or telephony signal) that instruct the interference unit to be in an active state (i.e., output response or interference signals) or an inactive state (i.e., do not respond to request or response signals). In such a way, the interference unit may be remotely configured to deny an authentication of a user. In an embodiment, the interference unit may be able to exchange short-range instructions with an external controller. For example, an external controller could exchange data with a remote server and control an activation state of the interference unit utilizing short-range communication (e.g., Bluetooth Low Energy, any of the IEEE 802.15.4 or IEEE 802.11 based protocols, etc.). Thus, the interference unit could use minimal power while enabling remote configuration to deny authentication of the user.

An interference unit may respond to a signal initiated by an authentication key to "jam" or override, or otherwise interfere with the signal from the authentication key. For example, certain motor vehicles have a remote start feature. With the remote start feature, a user presses a start button on a key fob and remotely starts the motor vehicle. In such cases, the interference unit may detect a beginning portion of the start signal from the fob and output an interference signal with a latter portion of the start signal.

The interference unit outputting together with an authentication key "confuses" the authentication system, making it unable to verify the response signal (e.g., authentication response). For example, when a "start" button is pushed, the motor vehicle broadcasts a request signal. As discussed above, when the fob receives the request signal, it outputs a wireless response. The interference unit likewise receives the request signal broadcast from the motor vehicle and outputs its own wireless response at or about the same time. Thus, the motor vehicle receives a response from both the fob and the interference unit around the same time, and the motor vehicle is unable to authenticate the fob's response signal due to interference from the interference unit or from the content of the interference message. In some cases, the interference unit could detect the wireless response from the fob and, in response, outputs an interference signal. Thus, the motor vehicle may still receive a response from both the fob and the interference unit around the same time, and the motor vehicle is unable to authenticate the fob. By outputting the response or interference signal only in response to detecting the request signal and/or response signal from the authentication device, the interference unit may have enhanced battery life. Although certain embodiments discuss the use of a key fob, one of ordinary skill will recognize in light of the present disclosure that the key fob could be, for example, a mobile phone, tablet, or other communication or multifunction device set-up to output an authentication response. Additionally, while key fob and/or authentication key may be used, this is merely an example and one of ordinary skill will recognize in light of the present disclosure that the interference unit 210 can operate with various authentication devices.

Aspects of the present disclosure will now be discussed with reference to the figures. While aspects of the present disclosure are discussed in relation to wireless authentication for user access or use of a keyless ignition system, these are merely examples. One of ordinary skill will recognize that aspects of the present disclosure may be used in various wireless authentication systems.

FIG. 1 illustrates an example of wireless authentication without an interference unit or with an interference unit being inactive. At 100a, user 130 approaches door 190. Door 190 is associated with authentication terminal 150. Authentication terminal 150 may have authentication activator 160 that instructs authentication terminal 150 to output an authentication request. As non-limiting examples, authentication activator 160 may be a button-switch or a presence sensor that detects the presence of user 130. However, these are merely examples, and authentication activator may be implemented in various forms as would be understood by one of ordinary skill. Additionally, in some cases, authentication terminal 150 may repeatedly or periodically output an authentication request.

At 100b, authentication terminal 150 outputs authentication request 155 (e.g., in response to a signal from authentication activator 160). If wireless authentication key 120 is present (e.g., in user's 130 hand or pocket), at 100c, wireless authentication key 120 outputs authentication response 125 in response to the request 155. At 100d, authentication terminal 150 validates authentication response 125 and opens doors 190.

Figure 2:
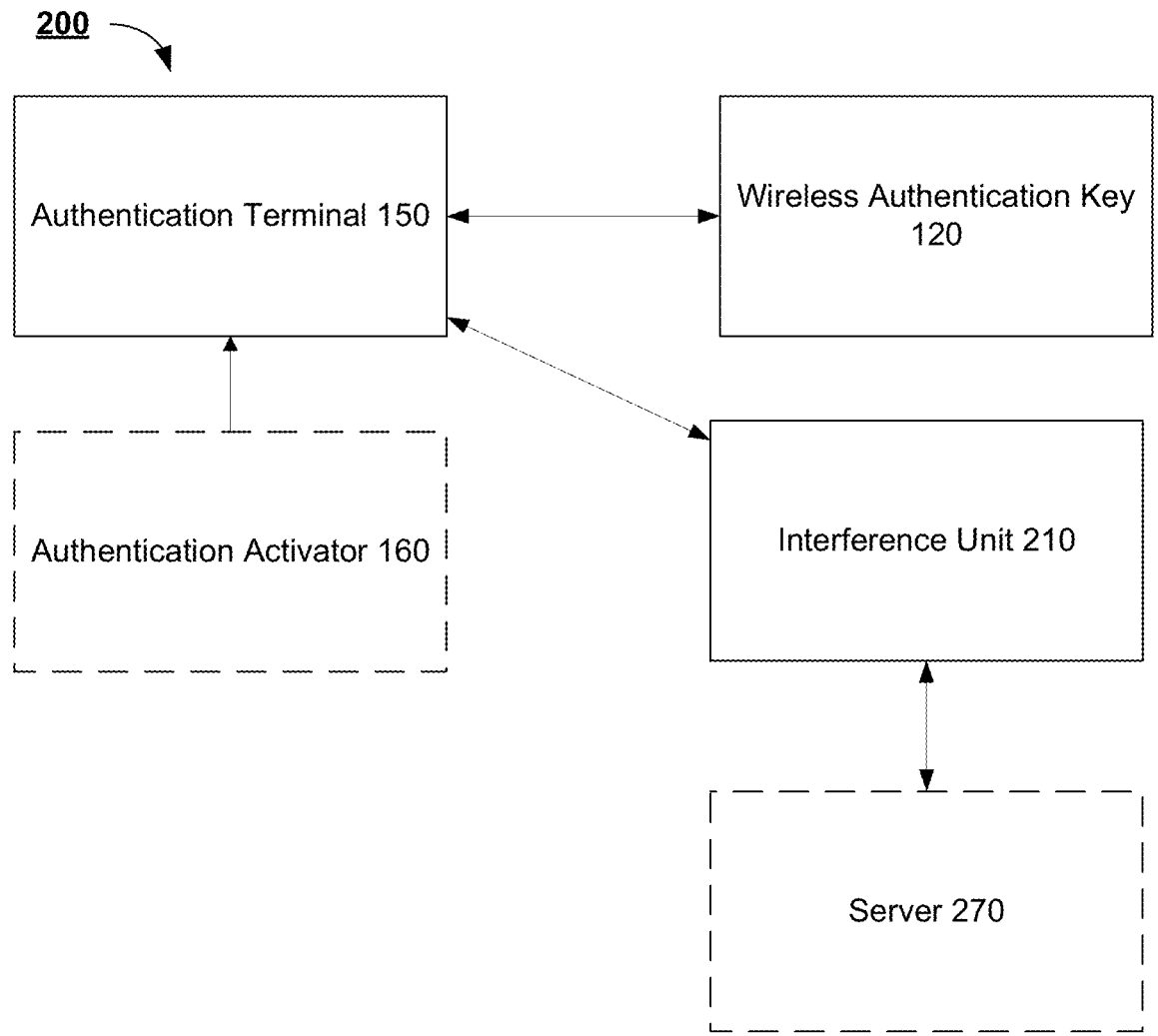
FIG. 2 illustrates an example a wireless authentication environment.

FIG. 2 is a block diagram of an example wireless authentication environment 200. Wireless authentication environment 200 includes authentication terminal 150, wireless authentication key 120, and interference unit 210. Wireless authentication environment 200 may also include authentication activator 160 and/or server 270. Authentication terminal 150 may output an authentication request (e.g., in response to instructions from authentication activator 160). Wireless authentication key 120 may output an authentication response to authentication terminal 150. If interference unit 210 is not present or in an inactive state, authentication terminal 150 may validate the authentication response to authorize wireless authentication key 120.

However, if interference unit 210 is present and active, interference unit 210 may output an interference signal (e.g., an interference signal) in response to the authentication request (e.g., a low-frequency request signal). For example, interference unit 210 may output the interference signal at a sufficient magnitude to substantially render the authentication terminal 150 unable to correctly receive the authentication response. In some cases, the interference signal may be a similar or greater amplitude as the authentication response as received by authentication terminal 150. If a directionality of transmitter antennas is asymmetrical, the antenna may be positioned such relative to the authentication terminal 150 to provide a sufficiently powerful interference signal. In some cases, interference unit 210 can control the frequency spectrum of the interference signal to match characteristics of the authentication terminal 150 (e.g., approximately match expected frequency and amplitude of the authentication response). For example, interference unit 210 can modulate a frequency of the interference signal in a specific way to match what is expected by the authentication terminal 150.

In other cases, the interference signal may interfere with, contradict, override, or otherwise alter portions of authentication response as it appears to be received by authentication terminal. Accordingly, the combination of the interference signal and the authentication response received by the authentication terminal 150 may provide different information than the authentication response received alone, making the reception invalid. In some cases, data from interference signal may comingle with data from authentication response as it is received by authentication terminal 150. In such cases, authentication terminal may be unable to differentiate the data contained in interference signal from the data contained in authentication response, making the authentication response unintelligible.

Interference unit 210 may be configured to detect an authentication request from authentication terminal 150 within a particular frequency range and respond thereto. For example, authentication terminal 150 may output the authentication request within one or more predetermined frequency range(s) or channel(s). One of ordinary skill will recognize that various signals may be transmitted within the predetermined frequency range(s), both by authentication terminal 150 and other external devices. Accordingly, interference unit 210 may be configured to identify and/or decode signals within the predetermined frequency range(s) to determine whether the signal is from authentication terminal 150 and/or corresponds to an authentication request. In some cases, interference unit 210 can be configured to determine how to detect a signal from authentication terminal 150 and/or an authentication key 120 (e.g., which frequency bands, modulation patterns, power levels to use, what authentication terminal 150 identifier(s) to look for in the incoming messages, etc.). In some cases, authentication terminal 150 and/or an authentication key 120 may operate over a plurality of frequency ranges, channels or spectrums either simultaneously or optionally. Additionally, interference unit 210 can be configured to customize an interference signal to be effective with a specific authentication terminal 150/authentication response. For example, interference unit 210 can create interference signals with various parameters such as transmit frequency channels, signal modulation, signal strength, signal duration, exact or partial data to be transmitted, etc.

In some cases, the predetermined frequency range(s) could include one or more bands from among 315 MHz, 433 MHz, and 868 MHz, and/or 915 MHz. However, the present disclosure is not so limited and, in some cases, interference unit 210 could operate in ranges similar to other ISM bands (e.g., 2.4 GHz and/or 5 GHz bands) as well as bands utilized by Ultra Wide Band (UWB) chips.

Additionally, in some cases, authentication key 120 and/or authentication terminal 150 may utilize different frequencies. For example, authentication terminal 150 may utilize a low frequency, (e.g., 125 kHz) while authentication terminal 150 may operate at a higher frequency (e.g., 315 MHz, 433 MHz, 868 MHz, 915 MHz, 2.4 GHz, etc.). Furthermore, authentication key 120 and/or authentication terminal 150 may use frequency hopping (e.g., defined, logic-controlled, random, or pseudo-random frequency hopping) to transmit authentication request and/or authentication response. Accordingly, in some cases, override unit 210 may monitor a plurality of channels or bands. Additionally, override unit 210 can output interference signal across a plurality of channels either simultaneously or in quick succession to interfere with or otherwise disrupt the authentication process. As a non-limiting example, if the authentication response is 6 milliseconds and includes frequency hopping across 3 channels, override unit 210 could output interference signal on each channel for 2 millisecond each in rapid succession. However, this is merely an example and, in some cases, interference unit 210 could be configured to mimic the frequency hopping of authentication terminal 150/authentication key 120 so that interference signal can mimic the authentication response.

Additionally, in some cases, interference unit 210 may have a plurality of output antennas of overlapping ranges. While the interference signal is broadcast in a first channel via a first antenna, a second antenna could be tuned to a next frequency in the frequency hopping sequence. Thus, when interference signal should broadcast over this next frequency, it may be immediately broadcast using the second antenna, thus minimizing tuning delays.

Interference unit 210 may include one or more receivers, one or more transmitters, and/or one or more transceivers. The receiver may detect signals (e.g., authentication request and/or authentication response) and the transmitter may broadcast signals (e.g., interference signal). The one or more receivers may be programmable or adjustable to detect signals within different frequency ranges and/or across different bands or channels. Similarly, the one or more transmitters may be programmable or adjustable to output signals within different frequency ranges and/or across different bands or channels. Interference unit 210 may also include a controller for controlling the receiver and transmitter, for example to tune one or more antennas of the receiver and transmitter and/or control output of the transmitter. Interference unit 210 may be configured to communicate with additional external systems.

In some cases, server 270 may communicate with interference unit 210, for example, over a wireless data channel (e.g., cellular, 4G, 5G, etc.). Server 270 may set an activation state of interference unit 210. In an active state, interference unit 210 may interfere with the authentication of authentication key 120. In an inactive state, interference unit 210 may not interfere with the authentication of authentication key 120. Accordingly, an additional layer of security may be provided by remotely controlling the interference unit 210 through server 270. However, this is only an example, and one of ordinary skill, in view of the present disclosure, would understand that various other remote or local systems may control interference unit 210. In some cases, interference unit 210 activate or deactivate based on lock commands. For example, with a motor vehicle, doors may be locked or unlocked remotely with a fob (e.g., authentication key 120) or through the use of cellular communication. Interference unit 120 may "listen" for an unlock command from the fob and/or a cellular device, and switch to an inactive state. Likewise, interference unit 120 may "listen" for a lock command from the fob and/or a cellular device, and switch to an inactive state. As another example, interference unit 210 may be active during periods of time (e.g., set to interfere with response signals during the night or specific days of the week) or specific locations (e.g. by use of geo-fences) when no authentication is desired. Additionally, interference unit 210 can be configured to determine when to output interference signals (e.g., when interference unit 210 is "on"). This can include, for example, awaiting specific instructions from an external system (e.g., server 270 and/or interference controller 640 as discussed below with reference to FIG. 6) and/or having a set (or preset) rule or algorithm for determining when authentication is allowed/override is disabled (e.g., based on specific geo-fencing, time of the day, external temperature, etc.).

Server 270 may also communicate with interference unit 210 to establish parameters for detecting an authentication request and/or an authentication response (e.g., frequency, message code), as well as parameters for outputting an interference signal (e.g., frequency, duration, amplitude). In such a way, interference unit 210 may be configurable to adapt to new and/or various authentication terminals 150 and authentication keys 120. In some cases, interference unit 210 may report tampering attempts to server 270. Thus, if a malicious user attempts to circumvent interference 210 through physical or electronic manipulation, an alert may be provided to server 270. Additionally, in some cases, interference unit 210 can detect unusually authentication request/response activity. For example, interference unit 210 would detect authentication requests and, if a number authentication requests are received in short succession when the interference unit is active, override unit 210 could alert server 270 of the repeated attempted authentication (e.g., access or vehicle start).

As would be understood by one of ordinary skill, different authentication terminals 150 and authentication keys 120 may operate over different frequency ranges, distances, and/or with different encoding mechanisms. Accordingly, in some cases, interference terminal 210 may be programmed to correspond to specific authentication terminals 150 and/or authentication keys 120. For example, if interference unit 210 is to be used with a specific motor vehicle, interference unit 210 may be configured to "confuse" the authentication terminal 1500 of the specific motor vehicle make, model, and year. For instance, a vehicle identification number (VIN) of the motor vehicle may be determined, and server 270 may determine the motor vehicle's make, model, and year and provide configuration instructions to interference unit 210. Specific vehicle identification may also be used to ensure only this particular vehicle is monitored for controlling access. Specifics of individual vehicle identification may be established during installation of the interference unit 210.

Figure 3:
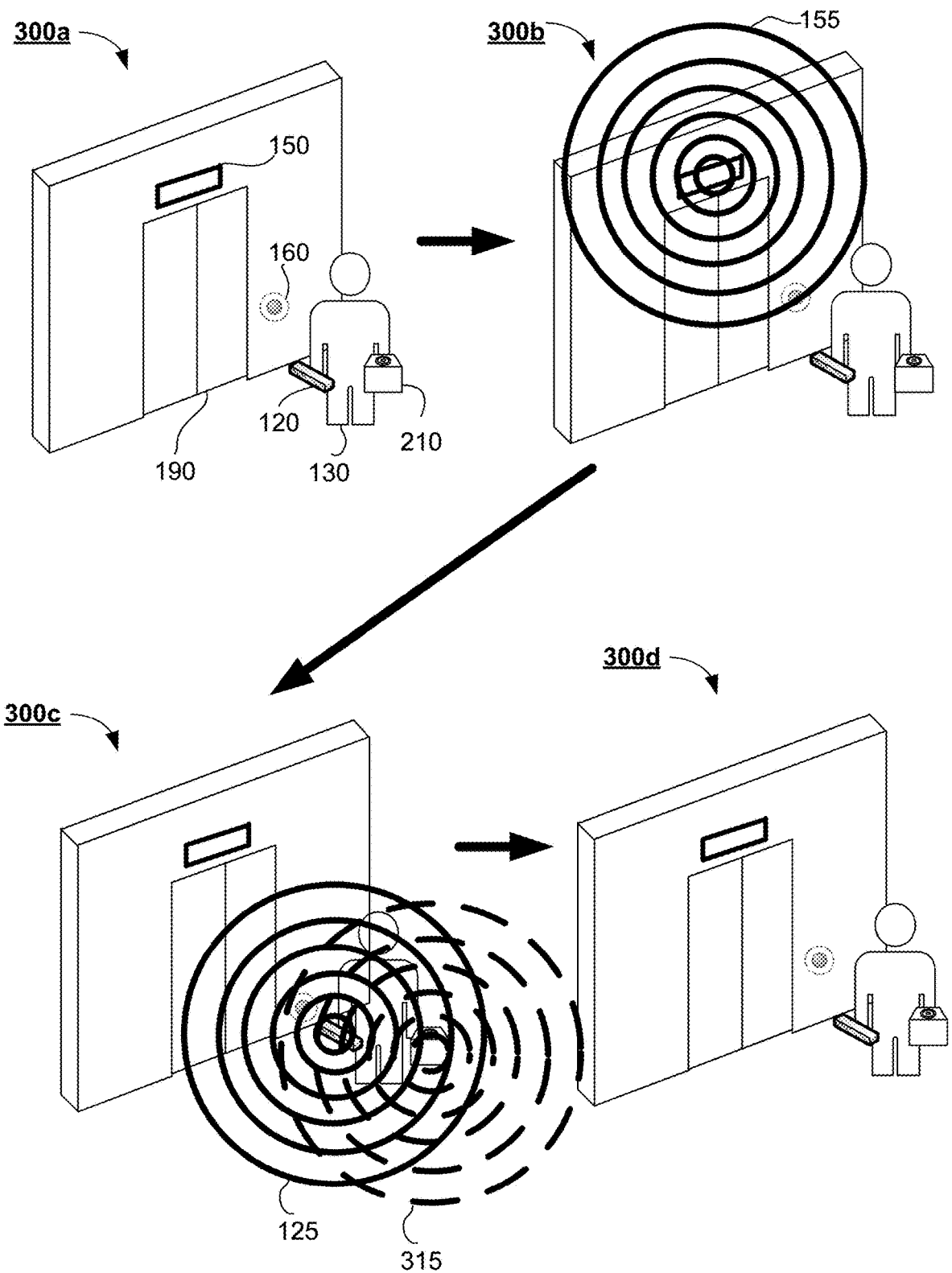
FIG. 3 illustrates an example of wireless authentication within a wireless authentication environment.

FIG. 3 illustrates an example of wireless authentication within wireless authentication environment 200. At 300*a*, user 130 approaches door 190. Door 190 is associated with authentication terminal 150, which controls access to door 190. Authentication terminal 150 may have authentication activator 160 that instructs authentication terminal 150 to output an authentication request. As non-limiting examples, authentication activator 160 may be a button-switch or a presence sensor. However, these are merely examples, and authentication activator may be implemented in various forms as would be understood by one of ordinary skill. Additionally, in some cases, authentication terminal 150 may repeatedly or periodically output an authentication request.

At 300*b*, authentication terminal 150 outputs authentication request 155 (e.g., in response to a signal from authentication activator 160, or periodically on its own). If wireless authentication key 120 and interference unit 210 are both present (e.g., in user's 130 hand(s) or pocket(s)), at 300*c*, in response to the request 155, wireless authentication key 120 outputs authentication response 125 and interference unit 210 outputs interference signal 315. Since authentication response 125 and interference signal 315 are output at substantially the same time, potentially from a similar location, authentication terminal 150 receives authentication response 125 and interference signal 315 at approximately the same time. Therefore, authentication terminal 150 is unable to validate authentication response 125. Accordingly, at 300*d*, authentication terminal 150 does not open doors 190.

In some cases, interference signal 315 may be output at a sufficient magnitude to substantially block authentication response 125. In such cases, authentication terminal 150 may not detect authentication response 125. In some cases, interference signal 315 may interfere with, contradict, override, or otherwise alter portions of authentication response 125 as it appears to be received by authentication terminal 150. Because of the apparent changes to authentication response 125, authentication terminal 150 may be unable to validate authentication response 125. In some cases, data from interference signal 315 may comingle with data from authentication response 125 as it is received by authentication terminal 150. In such cases, authentication terminal 150 may be unable to differentiate the data contained in interference signal 315 from the data contained in authentication response 125, and the data received would not correspond to a valid authentication key. In another case, the interference signal 315 may explicitly or implicitly signal the authentication terminal 150 to invalidate the authentication response 125 sent closely in time to the interference signal 315.

Figure 4:
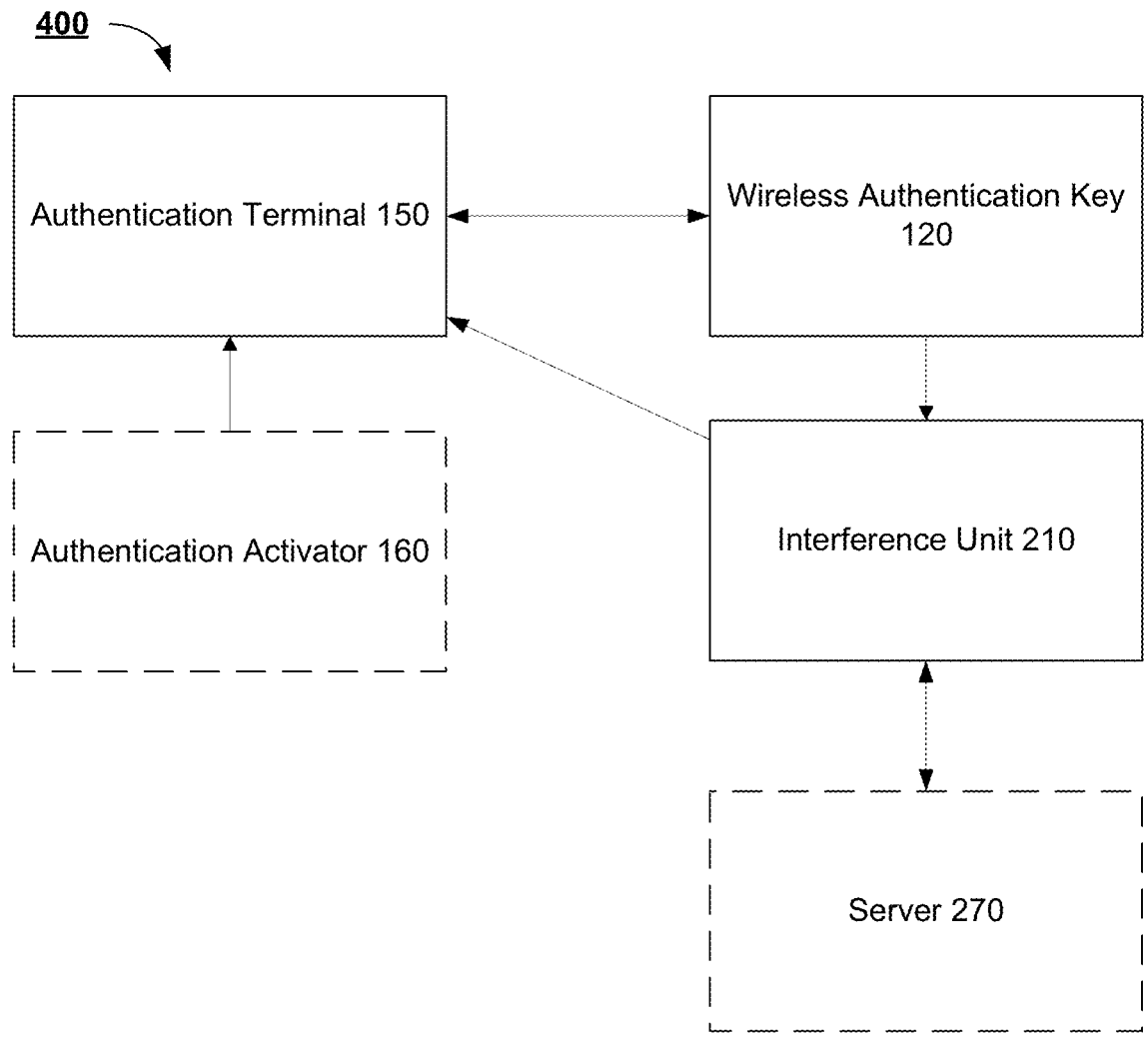
FIG. 4 illustrates an example a wireless authentication environment.

FIG. 4 is a block diagram of an example wireless authentication environment 400. Wireless authentication environment 400 includes authentication terminal 150, wireless authentication key 120, and interference unit 210. Wireless authentication environment 200 may also include authentication activator 160 and/or server 270. Authentication terminal 150, wireless authentication key 120, authentication activator 160, and server 170 may operate substantially similar to like elements discussed above with reference to FIGS. 2 and 3. For example, authentication terminal 150 may output an authentication request, and authentication key 120 may output an authentication response. If interference unit 210 is not present or inactive, authentication terminal 150 may validate the authentication response.

However, if interference unit 210 is present and active, interference unit 210 may output an interference signal in response to the authentication response from authentication key 120 (e.g., instead of or in addition to in response to the authentication request from authentication terminal 150). For example, interference unit 210 may respond to a signal in a specific frequency range of authentication key 120. In response to detecting the signal, interference unit 210 may output the interference signal. Interference Unit 210 may be programmed or configured to ensure that the interference signal is received at the same or overlapping time as the authentication response, before or immediately after it.

As discussed above, the interference signal may have a sufficient magnitude to substantially block the authentication response, thus preventing authentication terminal 150 from receiving the authentication response. In other cases, the interference signal may interfere with, contradict, override, or otherwise alter portions of authentication response as it appears to be received by authentication terminal 150. Accordingly, the combination of the interference signal and the authentication response received by the authentication terminal 150 may provide different information than the authentication response received alone, making the reception invalid. In some cases, data from the interference signal may comingle with data from the authentication response as it is received by authentication terminal 150. In such cases, authentication terminal 150 may be unable to differentiate the data contained in the interference signal from the data contained in the authentication response, making the authentication response unintelligible. In some cases, the interference signal may explicitly or implicitly signal the authentication terminal 150 to invalidate the authentication response sent closely in time to the interference signal.

Interference unit 210 may be configured to detect an authentication response from authentication key 120 within a particular frequency range and respond thereto. For example, authentication key 120 may output the authentication response within a predetermined frequency range. One of ordinary skill will recognize that various signals may be transmitted within the predetermined frequency range, both by authentication key 120 and other external devices. Accordingly, interference unit 210 may be configured to decode signals within the predetermined frequency range to determine whether the signal is from authentication key 120 and/or corresponds to an authentication response.

Figure 5:
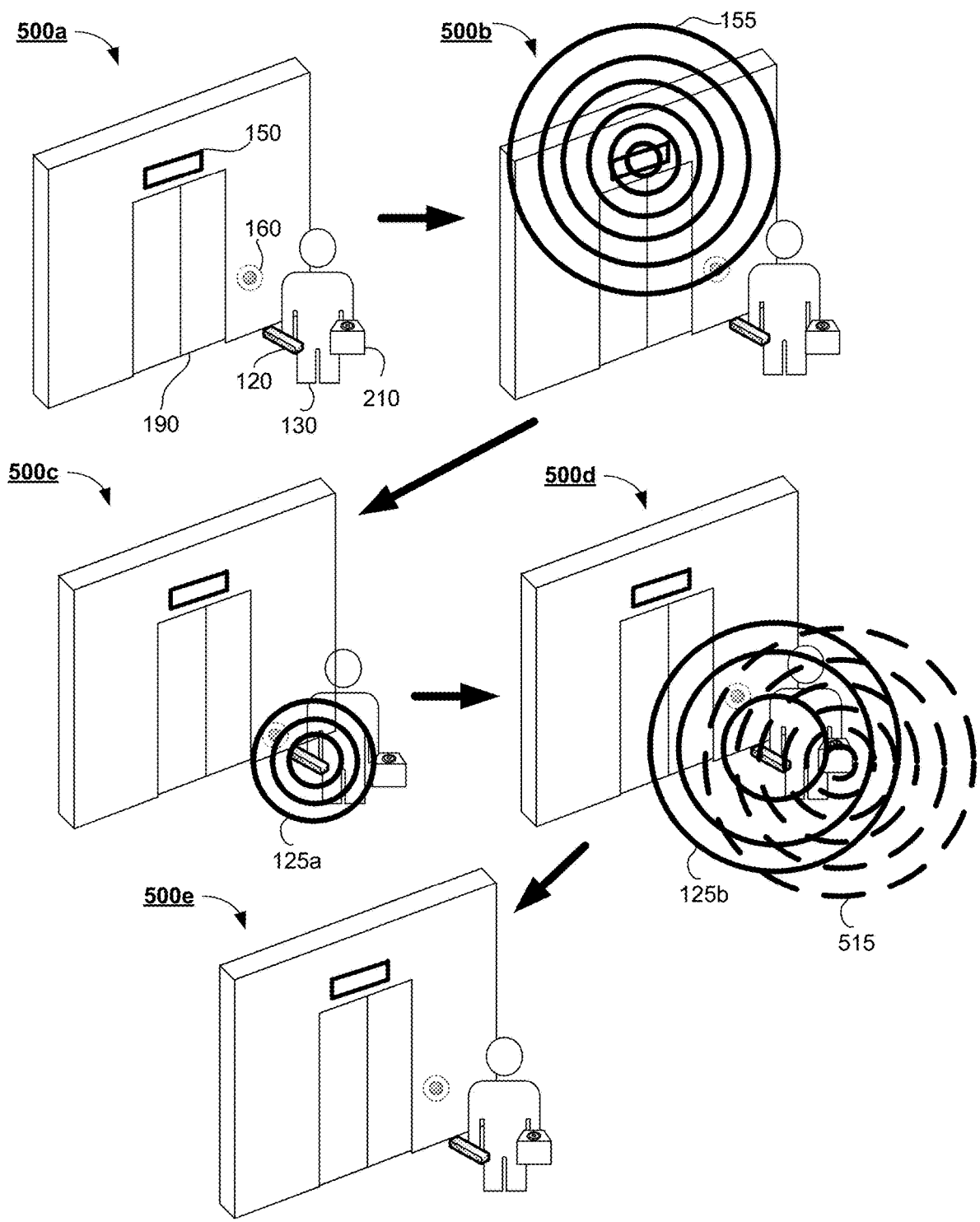
FIG. 5 illustrates an example of wireless authentication within a wireless authentication environment.

FIG. 5 illustrates an example of wireless authentication within wireless authentication environment 400. At 500*a*, user 130 approaches door 190. Door 190 is associated with authentication terminal 150. Authentication terminal 150 may have authentication activator 160 that instructs authentication terminal 150 to output an authentication request. As non-limiting examples, authentication activator 160 may be a button-switch or a presence sensor. However, these are merely examples, and authentication activator may be implemented in various forms as would be understood by one of ordinary skill. Additionally, in some cases, authentication terminal 150 may repeatedly or periodically output an authentication request.

At 500*b*, authentication terminal 150 outputs authentication request 155 (e.g., in response to a signal from authentication activator 160). If wireless authentication key 120 is present (e.g., in user's 130 hand or pocket), at 500*c*, in response to the request 155, wireless authentication key 120 outputs authentication response 125*a*. Then, if interference unit 210 is present and active (e.g., in user's 130 hand or pocket), at 500*d*, in response to detecting a first part of the authentication response 125*a*, interference unit 210 outputs interference signal 515. Thus, at least a portion of authentication response 125*b* and interference signal 515 are output at substantially the same time from a similar location (e.g., from within a certain distance from the authentical terminal 150), and authentication terminal 150 receives authentication response 125*b* and interference signal 515 at approximately the same time. Therefore, authentication terminal 150 is unable to validate authentication response 125. Accordingly, at 500*e*, authentication terminal 150 does not open doors 190.

Although FIGS. 4 and 5 are discussed with reference to an interference unit 210 responding to an authentication response, this is merely an example. In some cases, authentication key 120 may initialize an authentication attempt by outputting an authentication message. In view of the present disclosure, one of ordinary skill would recognize that interference unit 210 could detect and respond to an authentication message originating from authentication key 120 as if it was an authentication response.

Figure 6:
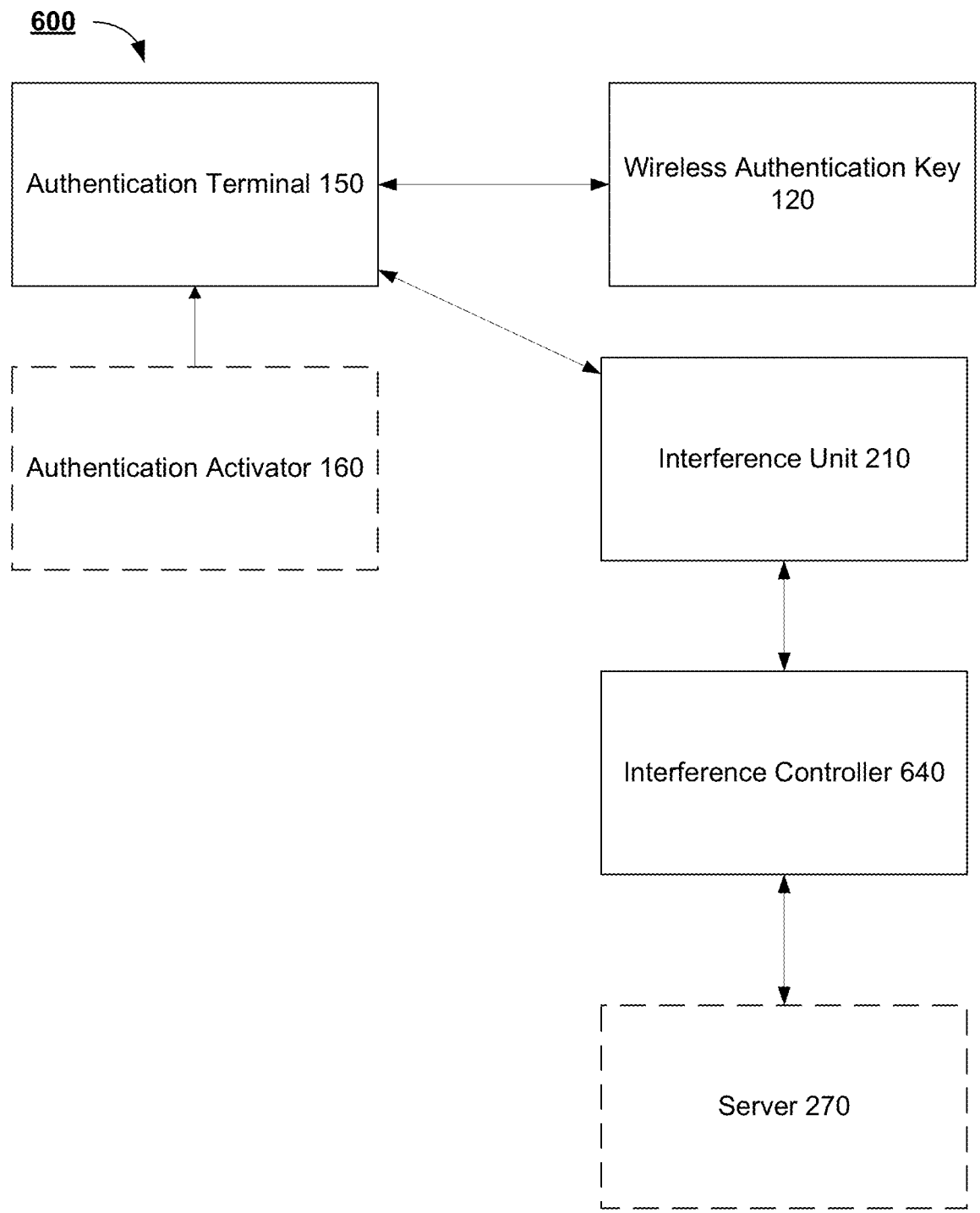
FIG. 6 illustrates an example of a wireless authentication environment.

FIG. 6 is a block diagram of an example wireless authentication environment 600. Wireless authentication environment 600 includes authentication terminal 150, wireless authentication key 120, interference unit 210, and interference controller 640. Wireless authentication environment 600 may also include authentication activator 160 and/or server 270. Authentication terminal 150, wireless authentication key 120, and authentication activator 160 may operate substantially similar to like elements discussed above with reference to FIGS. 2-5. For example, authentication terminal 150 may output an authentication request, and authentication key 120 may output an authentication response. If interference unit 210 is not present or inactive, authentication terminal 150 may validate the authentication response.

However, if interference unit 210 is present and active, interference unit 210 may output an interference signal in response to the authentication request from authentication terminal 150, the authentication response from authentication key 120, or both the authentication request and the authentication response, as discussed above with reference to FIGS. 3-5. Interference controller 640 may create a connection (e.g., using a short-range type connection such as one based on a Bluetooth standard, IEEE 802.15.4, or the like, using a physical connection) or otherwise broadcast instructions to interference unit 210. For example, the instructions may control an activation state of interference unit 210. In some cases, the instructions may configure interference unit 210 to operate with the specific authentication terminal 150 and/or authentication key 120.

As a non-limiting example, interference controller 640 could be a verification device or system. If the verification device determines that the condition is verified, it may control interference unit 210 to deactivate. For example, interference controller 640 could be an in-vehicle breathalyzer (e.g., an alcohol or drug interlock system). In this potential use case, a user would be required to breathe into the breathalyzer before being able to start their vehicle. If the breathalyzer determines that the individual is able to drive, the breathalyzer may signal the interference unit to allow authentication (e.g., for a predetermined period of time following verification). In other cases and at other times (e.g., whenever the breathalyzer does not determine that the individual is able to drive), the authentication may be not allowed.

In some cases, server 670 may communicate with interference controller 640, for example, over a wireless data channel (e.g., cellular, 4G, 5G, etc.). Server 670 may direct an activation state of interference unit 210, which is relayed by interference controller 640. One of ordinary skill, in view of the present disclosure, would understand that various other remote or local systems may communicate with interference controller 640. For example, in some cases, interference controller 640 may be configured to place interference unit 210 in an inactive state during periods of time (e.g., set to interfere with response signals during the night or on the weekend) when no authentication is desired. Interference controller 640 may be fixed near authentication terminal 150 and may have an extended power supply (e.g., either an independent battery or draw from the same power supply as authentication terminal 150) compared to interference unit 210. Thus, interference unit 210 may be remotely controlled while minimizing the size and power consumption of interference unit 210. In some cases, interference controller 640 may report tampering attempts to server 670. Thus, if a malicious user attempts to circumvent or uninstall interference controller 640, an alert may be provided to server 670.

While interference unit 210 and interference controller 640 may be separate devices, this is merely an example. In some cases, interference unit 210 and interference controller 640 may be combined in a single unit.

Figure 7:
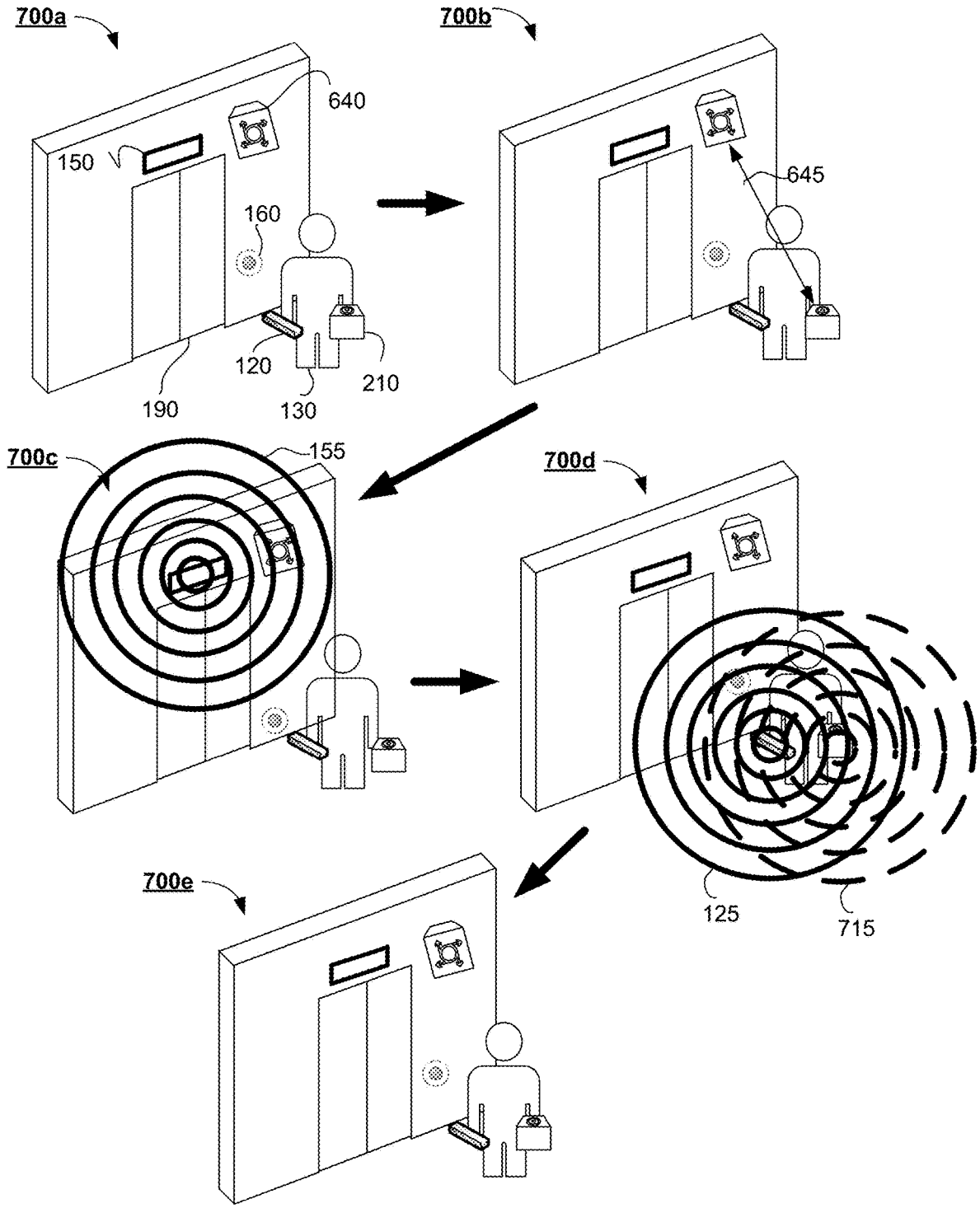
FIG. 7 illustrates an example of wireless authentication within a wireless authentication environment.

FIG. 7 illustrates an example of wireless authentication within wireless authentication environment 600. At 700*a*, user 130 approaches door 190. Door 190 is associated with authentication terminal 150. Authentication terminal 150 may have authentication activator 160 that instructs authentication terminal 150 to output an authentication request. As non-limiting examples, authentication activator 160 may be a button-switch or a presence sensor. However, these are merely examples, and authentication activator may be implemented in various forms as would be understood by one of ordinary skill. Additionally, in some cases, authentication terminal 150 may repeatedly or periodically output an authentication request.

At 700*c*, authentication terminal 150 outputs authentication request 155 (e.g., in response to a signal from authentication activator 160). If wireless authentication key 120 and interference unit 210 are present and interference unit 210 is in an active state, at 700*d*, in response to the request 155, wireless authentication key 120 outputs authentication response 125 and interference unit 210 outputs interference signal 715. Since authentication response 125 and interference signal 715 are output at substantially the same time from a similar location, authentication terminal 150 receives authentication response 125 and interference signal 715 at approximately the same time. Therefore, authentication terminal 150 is unable to validate authentication response 125. Accordingly, at 700*e*, authentication terminal 150 does not open doors 190.

Figure 8:
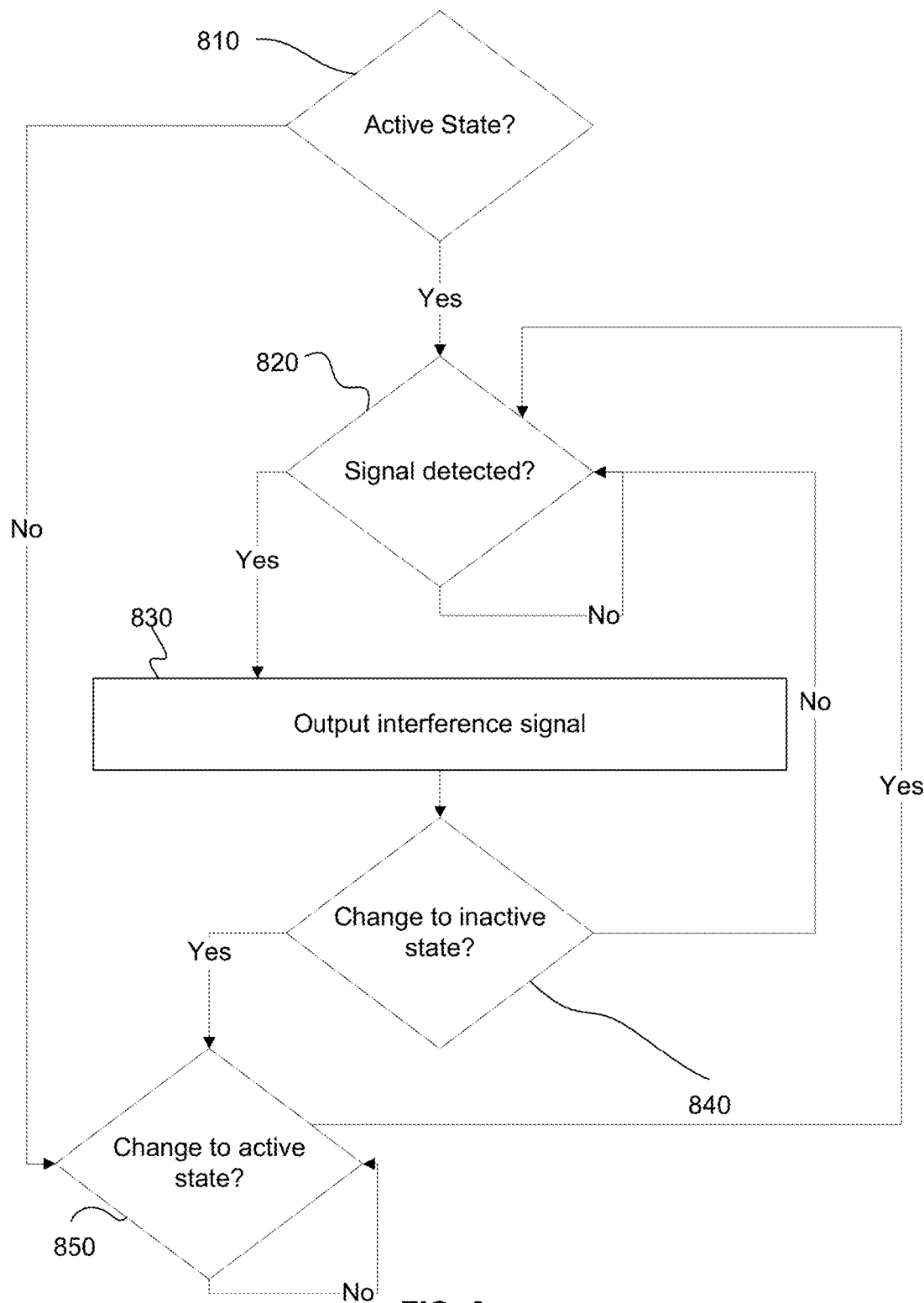
FIGS. 8 and 9 are flowcharts of example methods of operating an interference unit.

FIG. 8 is a flowchart 800 of an example method of operating an interference unit (e.g., interference unit 210). For ease of description, the flowchart 800 will be discussed with reference to interference unit 210, but this is merely an example, and one of ordinary skill will recognize, in light of the present disclosure, that the method may be performed by various other devices and in various other environments. At 810, interference unit 210 determines whether it is in an active state. For example, an activation state of interference unit 210 may be set by server 240, an interference controller, or by internal controls (e.g., a pre-set schedule or algorithms residing inside of the interference unit 210 that consider all sensor data available to the interference unit 210 when making the activation state determination). If interference unit 210 is in the active state (810—Yes), interference unit 210 waits to detect a signal at 820. Interference unit 210 may attempt to detect an authentication request from an authentication terminal 150, an authentication response from authentication key 120, or both an authentication terminal 150 and an authentication response from authentication key 120. The detection may be at same, similar or different frequencies.

In response to detecting the signal (820—Yes), interference unit 210 outputs an interference signal at 830. For example, interference unit 210 may output the interference signal at a sufficient magnitude to substantially block the authentication response, thus preventing authentication terminal 150 from receiving the authentication response. In other cases, the interference signal may interfere with, contradict, override, or otherwise alter portions of authentication response as it appears to be received by authentication terminal 150. In some other cases, it may signal the request to invalidate the message received as the authentication response that was received within close proximity. Accordingly, the combination of the interference signal and the authentication response received by the authentication terminal 150 may provide different information than the authentication response received alone, making the reception invalid. In some cases, data from interference signal may comingle with data from authentication response as it is received by authentication terminal 150. In such cases, authentication terminal 150 may be unable to differentiate the data contained in interference signal from the data contained in authentication response, making the authentication response unintelligible.

After outputting the interference signal, interference unit 210 may determine whether a change in state has occurred at 840 to place interference unit 210 into an inactive state. If no change of state has occurred (840—No), interference unit 210 again waits to detect a signal at 820. If the state changes to inactive (840—Yes), interference unit 210 waits until the state is changed back to active (850—Yes) before again awaiting to detect a signal at 820.

Figure 9:
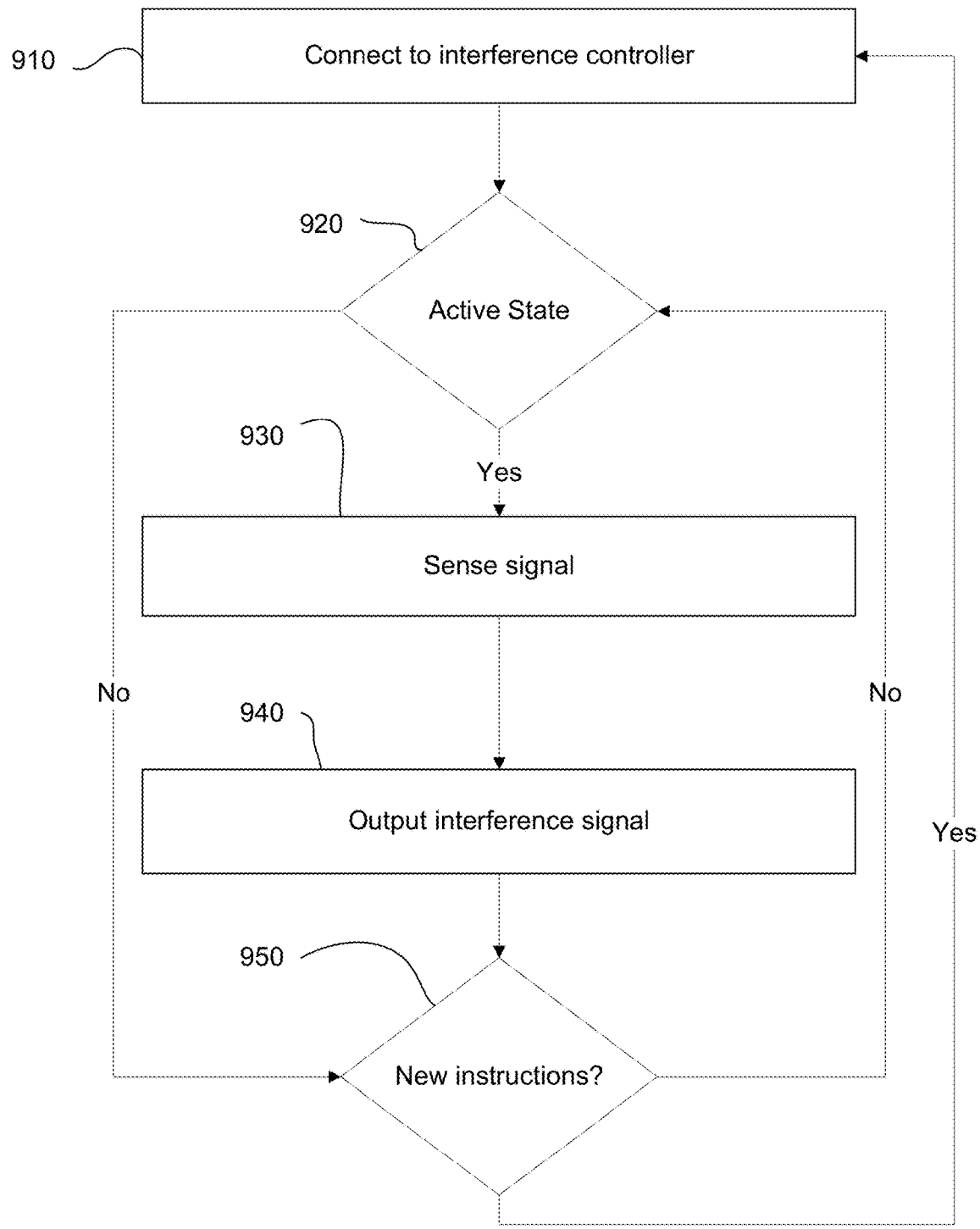

FIG. 9 is a flowchart 900 of an example method of operating an interference unit (e.g., interference unit 210). For ease of description, the flowchart 900 will be discussed with reference to interference unit 210, but this is merely an example, and one of ordinary skill will recognize, in light of the present disclosure, that the method may be performed by various other devices and in various other environments. At 910, interference unit 210 connects to interference controller 640. Interference controller 640 may set an activation state of interference unit 210. In some cases, interference controller 640 may likewise connect to a remote system (e.g., server 670), so that the authentication privileges may be established remotely. Next, interference unit 210 determines whether it is in an active state at 920. If interference unit 210 is in the active state (920—Yes), interference unit 210 senses a signal at 930. Interference unit 210 may sense an authentication request from an authentication terminal 150, an authentication response from authentication key 120, or both an authentication terminal 150 and an authentication response from authentication key 120 depending on a circumstance.

In response to detecting the signal, interference unit 210 outputs an interference signal at 940. For example, interference unit 210 may output the interference signal at a sufficient magnitude to substantially block the authentication response, thus preventing authentication terminal 150 from receiving the authentication response. In other cases, the interference signal may interfere with contradict, override, or otherwise alter portions of authentication response as it appears to be received by authentication terminal 150. Accordingly, the combination of the interference signal and the authentication response received by the authentication terminal 150 may provide different information than the authentication response received alone, making the reception invalid. In some cases, data from interference signal may comingle with data from authentication response as it is received by authentication terminal 150. In such cases, authentication terminal 150 may be unable to differentiate the data contained in interference signal from the data contained in authentication response, making the authentication response unintelligible.

After outputting the interference signal, interference unit 210 may determine whether new instructions are to be received at 950. For example, interference unit 210 may listen (e.g., periodically, constantly, near-constantly, or sporadically) for data broadcast or sent by interference controller 640. If the data indicates a change, interference unit 210 may query interference controller 640 for additional details. In this way, interference controller 640 may not be easily located by a malicious third-party, such as with the use of a wireless signal detector/triangulator. If no new instructions are to be received (950—No), interference unit 210 again determines with it is in an active state at 920. However, if new instructions are to be received (950—Yes), interference unit 210 again connects to interference controller 640 for the updated instructions (e.g., a change in state command or a change in an activation schedule).

As will be understood by one of ordinary skill, one benefit according to certain aspects of the present disclosure is that interference unit 210 may be swiftly installed and/or de-installed. This installation can be accomplished after-market without substantial physical interference with authentication terminal 150. For example, once interference unit 210 is configured to a particular authentication terminal 150 and/or authentication key 120 it only needs to be placed in relative proximity to the authentication terminal 150 to operate. Accordingly, in some cases, no hardware integration of interference unit 210 with authentication terminal 150 is required for interference unit 210 to operate. In some cases, installation could include loading configuration information into the interference unit 210 (e.g., by physical or wireless connection, such as by server 270), and moving the interference unit 210 proximal to the authentication terminal 150.

However, this is merely an example and, in some cases, interference unit 210 could be trained to a particular authentication key 120 and/or authentication terminal 150. For example, interference unit 210 could be instructed (e.g., by server 270) to identify with a authentication terminal 150 (e.g., be instructed to become in learning mode) and "listen" to an authentication request and/or response or a plurality of authentication requests and/or responses. Interference unit 210 may then, by itself, or working with the server 270, determine configuration data for listening to the particular authentication requests and/or responses and generating a configured interference signal. In some cases, interference unit 210 could communicate with server 270 to determine configuration setting based on the authentication request and/or authentication response. For example an authentication request could include vehicle identification (e.g. Vehicle Identification Number (VIN), License plate, etc.) information which could be communication to server 270. Server 270 may access a database to determine configuration information for the particular vehicle and send configuration instructions to interference unit 210.

Meanwhile, de-installation can be accomplished by removing interference unit 210 from an area proximal to authentication terminal 150. Since interference unit 210 may not be intimately integrated with authentication terminal 150, the installation and de-installation processes can be significantly faster and easier than the approaches described in the related art.

Additionally, because interference unit 210 may only require proximity to authentication terminal, it can be hidden from a user or otherwise secured. Accordingly, interference unit 210 provides additional security built into the system. For example, even if a malevolent actor acquires wireless authentication key 120, interference unit 210, when configured accordingly (either by its own logic, or via message from the server 270, or from any other device able to communicate to it) can prevent authentication despite the presence of authentication key. Additionally, by being hidden, interference unit 210 cannot be easily removed or overcome.

In some embodiments, interference unit 210 could be configured to communicate with an additional or alternative device to server 270. For example, a user device (such as a mobile phone or "smart phone") could connect with and/or exchange messages with interference unit 210 directly (through the use of short range communications such as Bluetooth, Near Field Communications, 802.15.4-based protocols and the like), or indirectly through any wireless or wired communications network, through server 270, and/or through interference unit 210. When a user would like to activate and/or deactivate interference unit 270, the user could send messages and/or instructions to interference unit 210 to operate accordingly. In another example, interference unit 210 can be configured to communicate with an additional device to server 270 that provides additional or alternative means of authentication of the user. This device can include, for example, a camera, a fingerprint scanner, or any other device able to recognize and authenticate the user and provide proof of authentication to the interference unit 210 either directly (e.g., through the use of a wired connection, wireless connections such as Bluetooth, Near Field Communications, 802.15.4-based protocols, UWB communications and the like), or indirectly (e.g., through a wireless or wired communications network, through server 270, and/or through interference unit 210).

Figure 10:
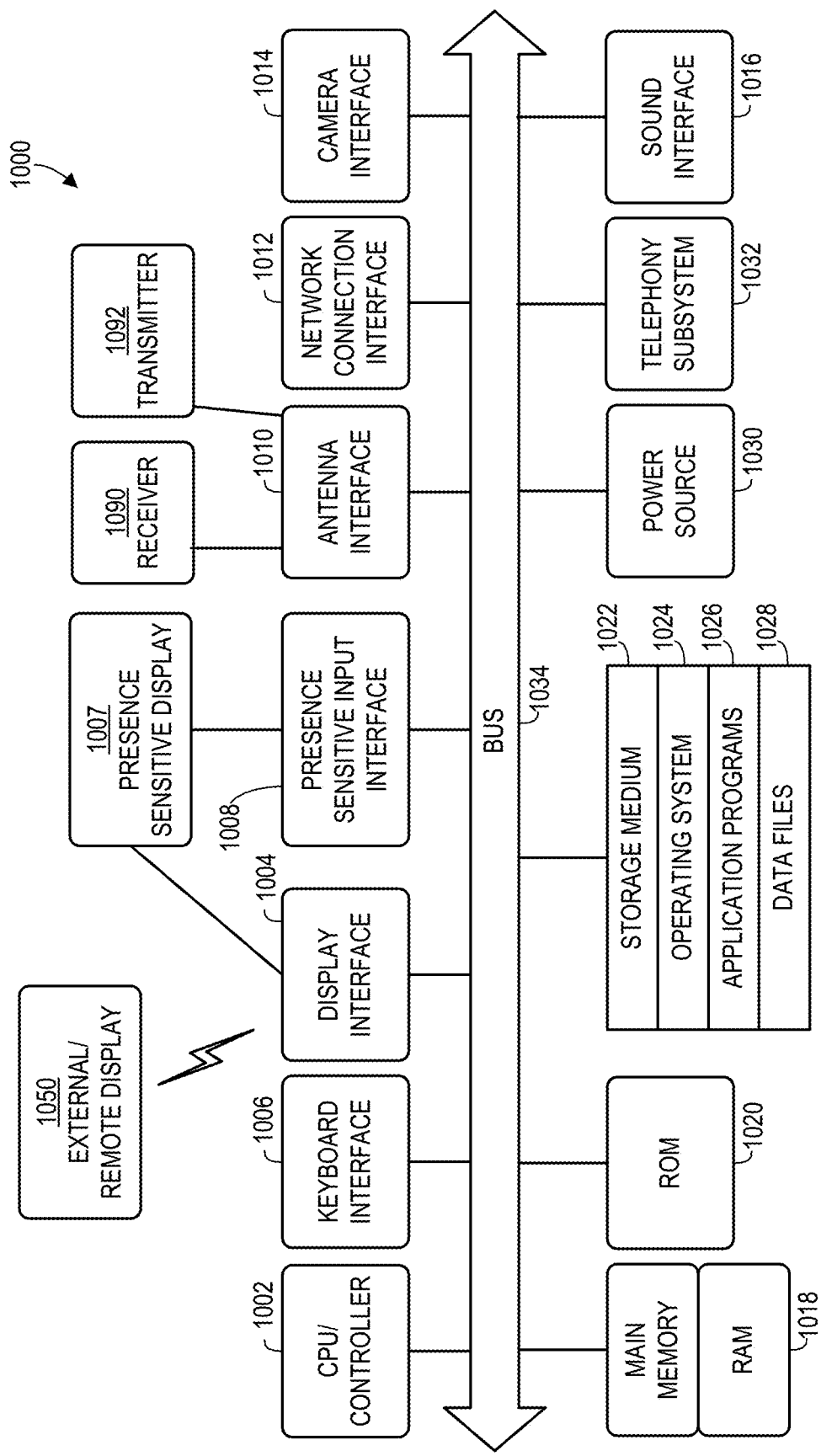
FIG. 10 is a block diagram of an illustrative system architecture.

FIG. 10 is a block diagram of an illustrative system architecture 1000, according to an example implementation. As non-limiting examples, portions of interference unit 210, authentication terminal 150, authentication activator 160, wireless authentication key 120, server 370, 670, and/or interference controller 640 may be implemented using one or more elements from the system architecture 1000. It will be understood that the device architecture 1000 is provided for example purposes only and does not limit the scope of the various implementations of the present disclosed systems, methods, and computer-readable mediums.

The computing device architecture 1000 of FIG. 10 includes a central processing unit (CPU) 1002, where computer instructions are processed, and a display interface 1004 that acts as a communication interface and provides functions for rendering video, graphics, images, and texts on the display. In certain example implementations of the disclosed technology, the display interface 1004 may be directly connected to a local display, such as a touch-screen display associated with a mobile computing device. In another example implementation, the display interface 1004 may be configured for providing data, images, and other information for an external/remote display 1050 that is not necessarily physically connected to the mobile computing device. For example, a desktop monitor may be used for mirroring graphics and other information that is presented on a mobile computing device. In certain example implementations, the display interface 1004 may wirelessly communicate, for example, via a Wi-Fi channel or other available network connection interface 1012 to the external/remote display 1050.

In an example implementation, the network connection interface 1012 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1004 may be operatively coupled to a local display, such as a touch-screen display associated with a mobile device. In another example, the display interface 1004 may be configured to provide video, graphics, images, text, other information, or any combination thereof for an external/remote display 1050 that is not necessarily connected to the mobile computing device. In one example, a desktop monitor may be used for mirroring or extending graphical information that may be presented on a mobile device. In another example, the display interface 1004 may wirelessly communicate, for example, via the network connection interface 1012 such as a Wi-Fi transceiver to the external/remote display 1050.

The computing device architecture 1000 may include a keyboard interface 1006 that provides a communication interface to a keyboard. In one example implementation, the computing device architecture 1000 may include a presence-sensitive display interface 1008 for connecting to a presence-sensitive display 1007. According to certain example implementations of the disclosed technology, the presence-sensitive display interface 1008 may provide a communication interface to various devices such as a pointing device, a touch screen, a depth camera, etc. which may or may not be associated with a display.

The computing device architecture 1000 may be configured to use an input device via one or more of input/output interfaces (for example, the keyboard interface 1006, the display interface 1004, the presence sensitive display interface 1008, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. As mentioned above, the display interface 1004 may be in communication with the network connection interface 1012, for example, to provide information for display on a remote display that is not directly connected or attached to the system. In certain implementations, a camera interface 1014 is provided that acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, a random-access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components.

According to an example implementation, the computing device architecture 1000 includes a telephony subsystem 1032 that allows the device 1000 to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 to execute software programs. Data may be stored in the RAM 1018, where the data may be accessed by the computer CPU 1002 during execution.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may include a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

An embodiment of the present disclosure may be implemented according to at least the following:

Clause 1: A wireless authentication interference unit including: a receiver; a transmitter; and a controller configured to: detect, via the receiver, a first wireless signal indicative of a wireless authentication protocol between an authentication terminal and an authentication key; and output, via the transmitter, an interference signal during a broadcast of an authentication message from the authentication key, wherein the interference signal disrupts authentication of the authentication key by the authentication terminal.

Clause 2: The wireless authentication interference unit of clause 1, wherein the first wireless signal includes an authentication request signal from the authentication terminal.

Clause 3: The wireless authentication interference unit of clauses 1 or 2, wherein the first wireless signal includes a first portion of the authentication message transmitted by the authentication key.

Clause 4: The wireless authentication interference unit of any of clauses 1-3, wherein the controller is further configured to output, via the transmitter, the interference signal at a sufficient magnitude to substantially block the authentication message from being detected by the authentication terminal.

Clause 5: The wireless authentication interference unit of any of clauses 1-4, wherein the controller is further configured to output, via the transmitter, the interference signal to alter a portion of the authentication message as it is received by the authentication terminal.

Clause 6: The wireless authentication interference unit of any of clauses 1-5, wherein the controller is further configured to output, via the transmitter, the interference signal to comingle with the authentication message.

Clause 7: The wireless authentication interference unit of any of clauses 1-6, wherein the controller is further configured to set an activation state of the wireless authentication interference unit based on a time of day.

Clause 8: The wireless authentication interference unit of any of clauses 1-6, wherein the wireless authentication interference unit is further configured to connect to a remote system to receive, via the receiver, an activation state instruction to place the interference unit in an active state or an inactive state.

Clause 9: The wireless authentication interference unit of any of clauses 1-8, wherein the wireless authentication interference unit is further configured to connect to a remote system to receive, via the receiver, configuration instructions for the interference unit.

Clause 10: The wireless authentication interference unit of clause 9, wherein the controller is further configured to: determine a received signal is the first wireless signal based on the configuration instructions; and output, via the transmitter, the interference signal during to disrupt the authentication message.

Clause 11: The wireless authentication interference unit of any of clauses 1-10, wherein the wireless authentication interference unit is further configured to connect to an interlock system, and the controller is further configured to allow authentication in response to instructions received from the interlock system.

Clause 12: The wireless authentication interference unit of clause 11, wherein the interlock system includes a breathalyzer.

Claim 13: The wireless authentication interference unit of clause 12, wherein the instructions received from the interlock system are indicative of the user being sober.

Clause 14: The wireless authentication interference unit of any of clauses 11-13, wherein the controller is configured to allow authentication in response to instructions received from the interlock system for a predetermined period of time following the instructions.

Clause 15: A wireless authentication method including: detecting, by an interference unit, a first wireless signal indicative of a wireless authentication protocol between an authentication terminal and an authentication key; and outputting, by the interference unit, an interference signal during a broadcast of an authentication message from the authentication key, wherein the interference signal disrupts authentication of the authentication key by the authentication terminal.

Clause 16: The wireless authentication method of clause 15, wherein the first wireless signal includes an authentication request signal from the authentication terminal.

Clause 17: The wireless authentication method of clauses 15 or 16, wherein the first wireless signal includes a first portion of the authentication message transmitted by the authentication key.

Clause 18: The wireless authentication method of any of clauses 15-17, wherein outputting the interference signal includes outputting the interference signal at a sufficient magnitude to substantially block the authentication message from being detected by the authentication terminal.

Clause 19: The wireless authentication method of any of clauses 15-18, wherein outputting the interference signal includes outputting the interference signal to alter a portion of the authentication message as it is received by the authentication terminal.

Clause 20: The wireless authentication method of any of clauses 15-19, wherein outputting the interference signal includes outputting the interference signal to comingle with the authentication message.

Clause 21: The wireless authentication method of any of clauses 15-20, further including receiving, prior to detecting the first wireless signal, an activation state instruction from a remote system to place the interference unit in an active state.

Clause 22: The wireless authentication method of any of clauses 15-21 further including: receiving, from a remote system and by the interference unit, configuration instructions for configuring the interference unit; configuring the interference unit to detect the first wireless signal; and configuring the interference unit to output the interference signal to disrupt the authentication message.

Clause 23: The wireless authentication method of any of clauses 15-22 wherein the interference signal is output in response to detecting the first wireless signal.

Clause 24: A method of installing a wireless authentication interference unit, the method including: configuring the wireless authentication interference unit to an authentication terminal; and positioning the wireless authentication interference unit proximal to the authentication terminal.

Clause 25: The method of clause 24, wherein the wireless authentication interference unit is the wireless authentication interference unit of any of Clauses 1-14 and 32.

Clause 26: The method of clause 24, wherein the wireless authentication interference unit includes a controller configured to detect a first wireless signal indicative of a wireless authentication protocol between the authentication terminal and an authentication key, and output an interference signal during a broadcast of an authentication message from the authentication key to disrupt authentication of the authentication key by the authentication terminal.

Clause 27: The method of clause 24, wherein configuring the wireless authentication interference unit includes determining configuration data by: detecting one or more authentication requests or response corresponding to the authentication terminal an and generating; determining configuration data based on the detected one or more authentication requests or response; and configuring the wireless authentication interference unit based on the determined configuration data.

Clause 28: A wireless authentication interference system including: an interference unit configured to: detect a first wireless signal indicative of a wireless authentication protocol between an authentication terminal and an authentication key, and output an interference signal during a broadcast of an authentication message from the authentication key, wherein the interference signal disrupts authentication of the authentication key by the authentication terminal; and an interference controller configured to control an activation state of the interference unit.

Clause 29. The wireless authentication interference system of clause 28, wherein the interference unit includes the interference unit of any of clauses 1-14 and 32.

Clause 30: The wireless authentication interference system of clause 28 or 29 wherein the first wireless signal includes an authentication request signal from the authentication terminal.

Clause 31: The wireless authentication interference system of any of clauses 28-30, wherein the interference unit is configured to output the interference signal in response to detecting the first wireless signal.

Clause 32: The wireless authentication interference unit of any of clauses 1-15, wherein the controller is configured to output the interference signal in response to detecting the first wireless signal.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   detecting a wireless signal indicative of an authentication protocol between an authentication terminal of a vehicle and an access device associated with the authentication terminal;
   determining whether the access device is permitted to access the vehicle; and
   in response to detecting the wireless signal and determining that the access device is not permitted to access the vehicle, outputting an interference signal to disrupt authentication of the access device by the authentication terminal.

2. The method of claim 1, wherein the authentication terminal and the access device are associated with a specific vehicle.

3. The method of claim 1, wherein outputting the interference signal comprises outputting the interference signal to alter a portion of an authentication message as it is received by the authentication terminal.

4. The method of claim 1, wherein the detecting a wireless signal and the outputting an interference signal are each completed by a wireless authentication interference system.

5. The method of claim 4 further comprising receiving an activation state instruction to cause the wireless authentication interference system to enter an active state or an inactive state, the active state being indicative of the access device not being permitted to access the vehicle.

6. The method of claim 5, wherein the wireless authentication interference system is configured to:
   output the interference signal only if the wireless authentication interference system is in the active state, and
   not output the interference signal if the wireless authentication interference system is in the inactive state.

7. The method of claim 6, wherein the activation state of the wireless authentication interference system is based on a time of day.

8. The method of claim 1 further comprising receiving configuration instructions to tailor the interference signal to disrupt the authentication of the access device by the authentication terminal, the configuration instructions comprising at least one of a broadcast frequency or a broadcast amplitude.

9. The method of claim 1 further comprising connecting to an interlock system; and
   in response to receiving approval instructions from the interlock system, preventing output of the interference signal.

10. The method of claim 9, wherein the interlock system comprises a breathalyzer.

11. The method of claim 10, wherein the approval instructions are indicative of a user likely being sober.

12. The method of claim 1 further comprising:
   detecting one or more authentication messages involving the authentication terminal, the one or more authentication messages comprising an authentication request or an authentication response;
   transmitting data indicative of the detected one or more authentication messages to a remote computing device;
   receiving configuration data from the remote computing device, the configuration data being determined from the one or more authentication messages and comprising a frequency, amplitude, and/or duration for the interference signal to disrupt authentication of the access device by the authentication terminal; and
   outputting the interference signal based on the configuration data.

13. The method of claim 1, wherein the outputting the interference signal occurs before the access device outputs a response to the wireless signal while permitting the access device to respond to the wireless signal.

14. A method of preventing access to a vehicle, the method comprising:
   receiving instructions for a wireless authentication interference system to enter an active state;
   detecting a wireless signal indicative of an authentication protocol between an access system of the vehicle and an access device associated with the vehicle; and
   in response to detecting the wireless signal and determining that the wireless authentication interference system is in the active state, outputting an interference signal via the wireless authentication interference system to disrupt authentication of the access device by the access system.

15. The method of claim 14, wherein outputting the interference signal comprises outputting the interference signal to alter a portion of an authentication message as it is received by the access system.

16. The method of claim 14 further comprising:
   receiving instructions for the wireless authentication interference system to enter an inactive state, and
   preventing output of the interference signal when the wireless authentication interference system is in the inactive state.

17. The method of claim 14 further comprising determining a time of day; and
   outputting the interference signal in response to determining that the time of day corresponds with a time of day in which the wireless authentication interference system is in the active state.

18. The method of claim 14 further comprising connecting to an interlock system; and
   in response to receiving approval instructions from the interlock system, preventing output of the interference signal.

19. The method of claim 18, wherein the interlock system comprises a breathalyzer.

20. The method of claim 19, wherein the approval instructions are indicative of a user likely being sober.

* * * * *